Sept. 1, 1942.  K. HEINDLHOFER  2,294,498

WELDING

Filed Dec. 4, 1940

Inventor:
KALMAN HEINDLHOFER,
by: John E. Jackson
his Attorney.

Patented Sept. 1, 1942

2,294,498

UNITED STATES PATENT OFFICE 2,294,498

WELDING

Kalman Heindlhofer, East Orange, N. J., assignor to United States Steel Corporation of Delaware, a corporation of Delaware Application December 4, 1940, Serial No. 368,533

3 Claims. (Cl. 219—8)

This invention relates to fusion arc welding and is particularly concerned with the problem of welding fine gaged work such as thin metal sheet and wire.

The prior art recognizes the necessity for controlling the direction of the necessarily low voltage arc between the electrode and fine gaged work, an example being the Larsen et al. Patent No. 2,173,450 which issued September 19, 1939. The present invention is applicable as an improvement on the invention disclosed by this patent, and on the prior art practice disclosed thereby, it providing even greater accuracy of arc control and, particularly, providing more accurate control of the pilot spark created by the use of the higher voltage sparking current used in addition to the lower voltage arc welding current, to provide a pilot spark which the welding arc follows.

Figure 1:
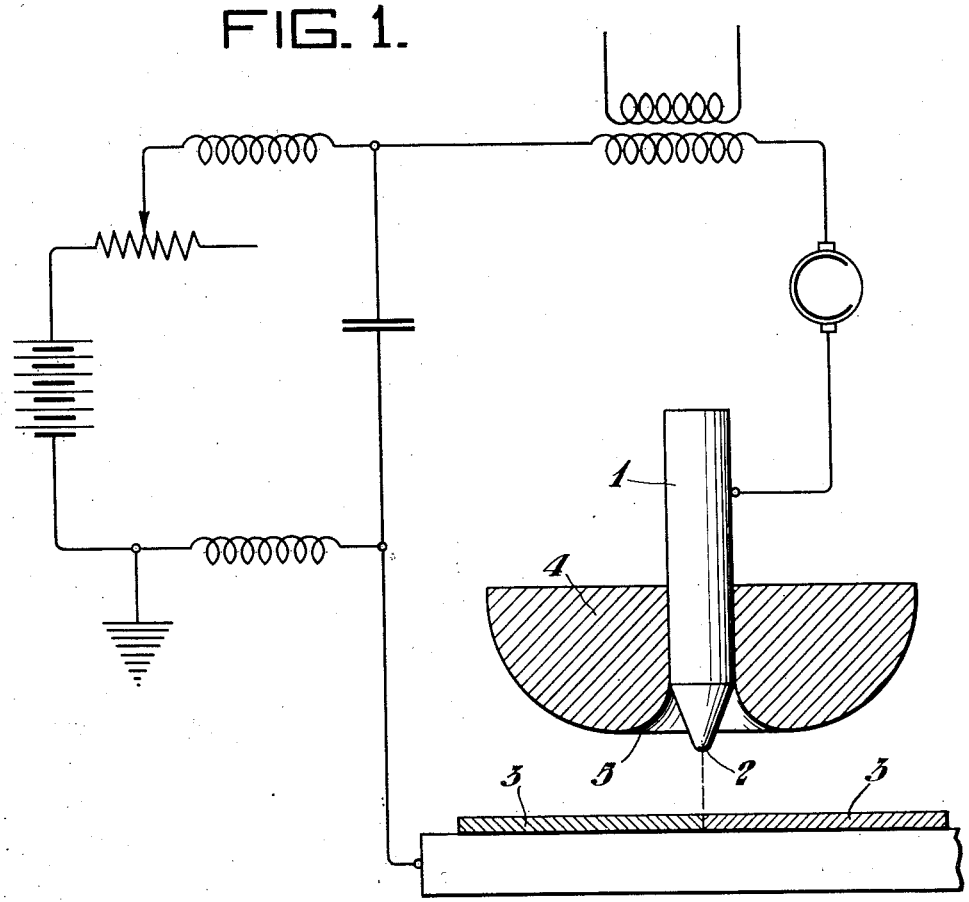
Figure 2:
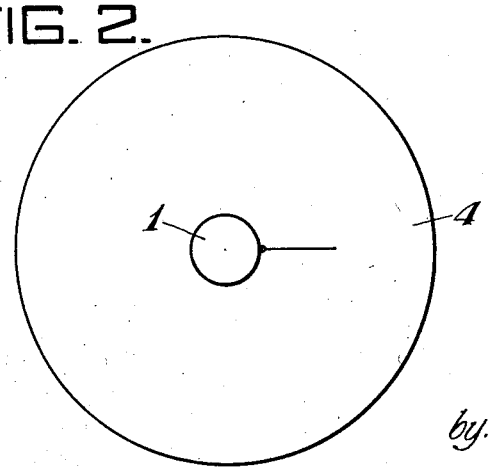

A specific example of the invention is schematically illustrated by the accompanying drawing, in which:

Figure 1 is a side view; and
Figure 2 is a top view.

More specifically, the drawing shows a carbon electrode 1 with a sharp point 2 in alignment with the junction of abutted, thin gaged parts 3 which either may be sheet or wire parts or the like. When the electrode 1 is provided with a current of sufficient potential a spark will rather accurately be directed from its sharp point 2 to the junction between the parts 3 which may be said to be a target. This would mean that upon simultaneous or immediately subsequent impression of a lower voltage, higher amperage current, welding heat would be applied accurately at this target. However, the electrode point soon becomes blunt under normal working conditions and, therefore, highest accuracy from this direction cannot be expected in practical work.

According to the present invention an electrically conductive ring 4 is provided through which the electrode 1 is frictionally fitted in electrical connection therewith, the point 2 being arranged approximately flush with the adjacent face 5 of the ring. This face 5 is of radially rounded contour, that is to say, the annular face is transversely convex, and is in a plane at right angles to the electrode axis. Since, as is usual in work of this sort, the electrode axis is arranged at right angles to the work-pieces providing the target, this right angular face is parallel to this target.

With this ring or its equivalent, an electrostatic field of the same polarity and potential as the electrode powering potential, is set up each time or whenever the electrode is energized to create a pilot spark between it and the target, and this field functions to repulse the spark from undesired paths. Since the ring surrounds the electrode with its radially rounded face in a plane at right angles to the electrode axis, the electrostatic field may be said to focus the pilot spark on the target in the case of the illustrated sample. When the lower voltage, higher amperage current is applied it creates an arc which naturally follows this pilot spark so as to accurately hit the target and cause welding heat to be applied with precision at the junction of the parts where it is wanted and no place else.

It is to be understood that the electrode and work may be energized as shown in the mentioned patent and as indicated by the accompanying drawing, or they may be energized by equivalent systems, the main thing being to apply a current of sufficient potential to cause pilot sparking or arcing without the electrode touching the work and to then apply the lower voltage, higher amperage welding current which follows the pilot to the target. The present invention is applicable whether the principles of the mentioned patent are used, at least insofar as initially hitting the target is concerned. Furthermore, the potential applied the ring need not be the same as that applied the electrode providing it is sufficient to perform the function described.

Summarizing, the broad thought is to position a member of the proper shape to repulse the pilot spark by electrostatic action from undesired paths so it is forced to hit the desired point with accuracy when provided with current of sufficient potential for this purpose having the same polarity as the welding arc electrode.

I claim:

1. The combination of an arc welding electrode and an electrically conductive ring surrounding said electrode and electrically connected therewith, the operative end of said electrode projecting through said ring and the side of the latter adjacent said point being of radially rounded contour.

2. The combination of an arc welding electrode, means for applying sufficient electrical potential of opposite polarity to said electrode and the work to be welded to create a pilot spark therebetween without their first intercontacting, means for creating an electrostatic field surrounding the intended path of said spark of the same polarity as said electrode and having sufficient potential to confine said spark to said path to an appreciable degree, and means for providing said electrode and work with arc welding current prior to termination of said spark to create a welding arc therebetween which follows the path of said spark.

3. The combination of an electrode pointing toward a substantially flat work surface in spaced relation thereto, means for applying sufficient electrical potential of opposite polarity to said electrode and said surface to create an electric spark therebetween, and means for creating an annular electrostatic field surrounding said spark with the same polarity as said electrode and sufficient electrical potential to appreciably confine said spark to a path restricted by the position of said field.

KALMAN HEINDLHOFER.